US012798519B2

(12) United States Patent
Reith et al.

(10) Patent No.: US 12,798,519 B2
(45) Date of Patent: Nov. 17, 2026

(54) WINDSHIELD WIPER SYSTEM

(71) Applicant: Robert Bosch GmbH, Stuttgart (DE)

(72) Inventors: Manuel Hans Reith, Lauf (DE); Jean-Luc Augier, Beinheim (FR); Michael Kruse, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 18/495,028

(22) Filed: Oct. 26, 2023

(65) Prior Publication Data

US 2024/0140362 A1 May 2, 2024

(30) Foreign Application Priority Data

Oct. 28, 2022 (DE) ..................... 10 2022 211 475.2

(51) Int. Cl.
*B60S 1/08* (2006.01)

(52) U.S. Cl.
CPC .................................. *B60S 1/0818* (2013.01)

(58) Field of Classification Search
CPC .................................................... B60S 1/0818
See application file for complete search history.

(56) References Cited

U.S. PATENT DOCUMENTS 7,337,750 B2 * 3/2008 Drake .................. A01M 29/06 116/22 A
7,528,500 B2 * 5/2009 Kwon .................. B60S 1/0818 15/250.001
7,795,831 B2 * 9/2010 Kwon ....................... B60S 1/08 318/443
11,472,374 B2 * 10/2022 Ueda ..................... B60W 40/02
11,904,908 B2 * 2/2024 Kobayashi ............ B60S 1/0818
2003/0036859 A1 * 2/2003 Muller .................. B60S 1/0818 702/45
2024/0140362 A1 * 5/2024 Reith ........................ B60S 1/08
2025/0187565 A1 * 6/2025 Livingston, Jr. .......... B60S 3/04

FOREIGN PATENT DOCUMENTS

CN 202641633 U 1/2013
CN 114852015 A 8/2022
DE 102011115590 A1 * 4/2013 ................ B60S 1/08

* cited by examiner

*Primary Examiner* — Michael A Berns
(74) *Attorney, Agent, or Firm* — Michael Best & Friedrich LLP

(57) ABSTRACT

A windshield wiper system for a vehicle. In one example, the windshield wiper system includes a drive, a wiper, and a control device, which is connectable to a continuous power supply of the vehicle. The control device is configured to communicate with at least one control unit of the vehicle via a predefined data transfer system, and to control the drive to move the wiper arm based on specifications from the control unit. Another example relates to a method for controlling a windshield wiper system of a vehicle, where the system is configured to clean a windshield of the vehicle by means of at least one wiper. The method includes monitoring an environment of the vehicle, establishing a wiper mode for detected conditions in the environment of the vehicle, and controlling a drive of the windshield wiper system to move the wiper according to the wiper mode.

8 Claims, 1 Drawing Sheet

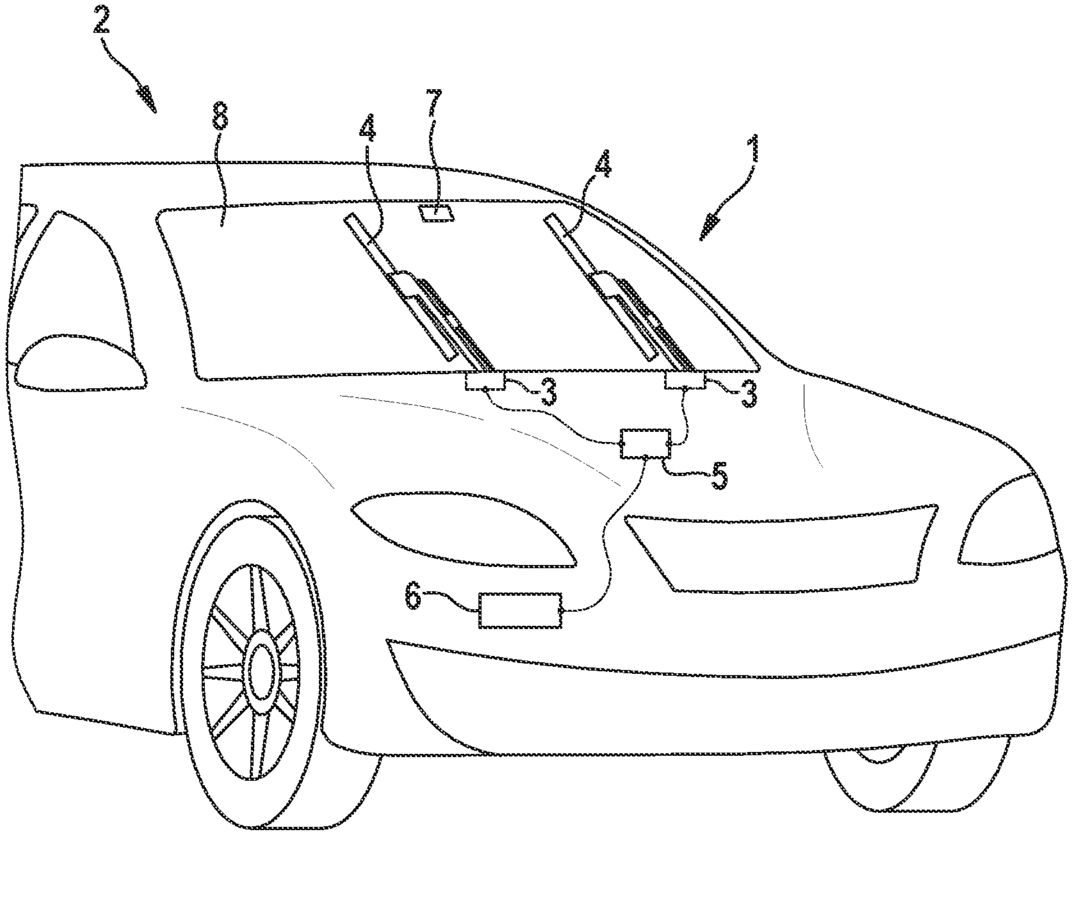
2
8
4
7
4
1
3
3
5
6

WINDSHIELD WIPER SYSTEM

BACKGROUND OF THE INVENTION

The present invention relates to a windshield wiper system. The invention furthermore relates to a method for controlling a windshield wiper system.

Windshield wiper systems for vehicles that only function when the ignition is on are known from the prior art. The reason for this design is that the wiping of the windshield by the windshield wiper system is intended to be performed during travel. If the vehicle is not in operation, then the windshield wiper system is inactive.

SUMMARY OF THE INVENTION

The windshield wiper system for a vehicle according to the invention enables a more diverse use than was previously possible in the prior art. In particular, connectivity to the vehicle enables the performance various wiper modes. In particular, a risk of damage to the wiper system due to weather influences and/or incorrect subsequent actions is reduced.

The windshield wiper system comprises a drive, a wiper that can be driven by the drive, and a control device. The control device is connectable to a continuous power supply of the vehicle. In particular, it is provided that the control device is not or will not be deactivated when the vehicle is inactive, e.g., parked.

The control device is configured to communicate with at least one control unit of the vehicle and to control the drive via a predefined data transfer system, in particular a predefined data transfer protocol. In this way, the control device enables the wiper arm to be moved based on specifications of the control unit. In particular, wiping can thus be triggered. This does not require the vehicle to be in operation. Rather, wiping can also be performed while the vehicle is stopped, for example during a pause in operation. This preferably also enables a user to start the wiping operation by means of a user terminal from outside the vehicle.

The dependent claims specify preferred embodiments of the invention.

Advantageously, the control device is configured to receive a wiping mode to be performed by the control unit of the vehicle. The control device is configured to perform this wiping mode by controlling the drive accordingly. Alternatively or additionally, it is provided that the control device is configured to receive a wiping duration to be performed from the control device. The control device is in particular configured to control the drive to perform the wiping duration. As a result, different wiping options can be specified by the control unit easily and at any time.

The control device is preferably configured to monitor an environment of the vehicle. It is particularly advantageous that the control device monitors the environment by detecting the environment by means of at least one sensor of the vehicle. Environmental conditions in particular can thus be detected. It is particularly provided that the control device is configured to control the drive according to conditions in the environment of the vehicle. The windshield wiper system can therefore be operated based in particular on weather conditions in the environment. This is particularly advantageous when the vehicle is parked and/or not in operation.

The predefined data transfer system is in particular a bus system. Particularly preferably, the bus system is a CAN bus, a CAN FD bus, and/or a LIN bus, and/or a FlexRay bus. Alternatively, instead of a bus system, an Ethernet connection can also be used. Particularly advantageously, the windshield wiper system can be controlled by a VSS-capable (vehicle signal specification) control unit and a corresponding communication, e.g., via CAN and/or LIN. In particular, this enables control via a vehicle control unit (electronic control unit, ECU), e.g., a zone ECU or a superordinate control unit, e.g., a superordinate vehicle computer.

The invention also relates to a method for controlling a windshield wiper system of a vehicle. It is provided that the windshield wiper system is configured for cleaning a windshield by means of at least one wiper. The method comprises the following steps: Monitoring of an environment of the vehicle is performed. Monitoring is particularly advantageously on a continuous basis. Preferably, it is provided that monitoring takes place when the vehicle is in a parking mode. The vehicle is in particular inactive thereby. In addition, a wiper mode is established for detected conditions in the environment of the vehicle. One possible wiper mode can include the wiper remaining in a parked position. Should the wiping mode provide a wiping action, there is in particular a control of a drive of the windshield wiper system to move the wiper according to the wiping mode. A targeted use of the windshield wiper system is therefore also possible if the vehicle is not in the operating state, i.e., in particular the vehicle ignition is switched off.

In one preferred embodiment, monitoring the environment of the vehicle includes identifying weather data for the environment of the vehicle. The wiper mode is in this case established as a function of the weather data. Operation of the windshield wiper system can therefore be adjusted to prevailing weather conditions, which enables an advantageous preparation of the vehicle for future operation. In particular, continuous soiling of the windshield is minimized. Identified weather data are particularly advantageously transferred to a server, and/or a cloud, and/or to other vehicles.

In particular, various wiper modes are provided. Thus, in a precipitation wiper mode, parking of the wiper is provided in such a position that allows precipitation impacting the windshield to drain off. Such a position is in particular close to the A-pillar and/or parallel to the A-pillar. The precipitation is therefore not retained by the wiper and can leave the windshield unhindered. This would not be the case if the wiper was in its usual resting position at the lower portion of the windshield.

As an alternative or additional mode, a snow wiper mode is provided. Conventional windshield wiper systems are not configured to clear a snow-covered windshield. Instead, in such a case, an overload occurs for the wiper resulting in increased wear and/or shorter life. However, if snowfall is detected as a weather condition, it is preferable for the windshield to be wiped with the wiper as long as the weather data includes a snowfall. Doing so prevents a snow layer from forming on the windshield, which could lead to an overload of the wiper. Instead, any snow is continuously cleared away. In particular, this is done at individual intervals or at an adjusted wiping speed, wherein the parameters for the intervals or speeds are derived from the weather data.

Particularly preferably, identifying weather data comprises retrieving a weather report from another unit. The other unit is preferably a server. The retrieval is particularly advantageous via a mobile data connection, for example a mobile telephone connection or a Wi-Fi connection. Alternatively or additionally, it is provided that identifying weather data comprises detecting weather data using sensors. In particular, the sensors enable direct detection of weather data from the environment of the vehicle. It is then preferably provided that such a sensor is configured to detect precipitation. Particularly advantageous is a type and/or amount and/or duration of precipitation detected and considered as weather data for selecting the wiper mode.

Preferably, monitoring the environment of the vehicle comprises detecting persons and/or animals. This is in particular performed by proximity sensors and/or camera images. It is provided that preferably a startle wiper mode is performed in this case. In the startle wiper mode, the wiper is moved in order to startle the animal and/or the human. Particularly advantageously, at least one cleaning nozzle of the windshield is additionally activated. As a result, the startling effect can be enhanced. An associated pump is preferably activated by the controlled drive of the wiper. In this way, in particular animals can be prevented from establishing themselves on the vehicle. In particular, it is also possible to prevent people from sticking advertising flyers or the like to the wiper. In particular, the startle wiper mode is implemented only when the vehicle is stationary, preferably parked. This movement or functionality also protects the wiper against theft.

The invention also relates to a computer program. The computer program is configured to perform the method as previously described. In particular, the computer program is executed on a computer in order to perform the method steps. The computer is preferably a control unit of a vehicle.

The invention further relates to a machine readable storage medium on which the computer program is stored as previously described. The storage medium is preferably a magnetic, and/or electrical, and/or optical, and/or magneto-optical data storage means.

Finally, the invention relates to a vehicle. The vehicle comprises a windshield wiper system as described hereinabove and/or a control unit configured to perform a method as described hereinabove. It is provided that the windshield wiper system and/or the control unit is connected to a server or integrated into a cloud in order to control the windshield wiper system via the server or via the cloud. Doing so in particular enables control of the windshield wiper system via a user terminal, e.g. a cell phone with a corresponding application.

BRIEF DESCRIPTION OF THE DRAWINGS

Exemplary embodiments of the invention are described in detail hereinafter with reference to the accompanying drawings. The drawings include:

FIG. 1 a schematic view of a vehicle with a windshield wiper system according to an exemplary embodiment of the invention,

DETAILED DESCRIPTION

FIG. 1 schematically shows a vehicle 2 having a windshield wiper system 1 according to one exemplary embodiment of the invention. The windshield wiper system 1 comprises two wipers 4, each having a drive 3. The wipers 4 are configured to wipe a windshield 8 of the vehicle. In this example, the windshield 8 is the front windshield of the vehicle 2. In this example, the wipers 4 are synchronous, but can also be configured in an opposing manner. The wiper 4 includes one or more wiping arms, which are moved by the drive 3 directly or by means of a linkage.

The windshield wiper system 1 further comprises a control device 5. The control device 5 is connected to a continuous power supply of the vehicle 2. In addition, it is provided that the vehicle 2 comprises a control unit 6, the control device 5 being configured to communicate with the control unit 6 of the vehicle 2. In this way, the control device 5 can be sent wiping specifications by the control unit. The control device 5 is configured to control the drive 3 to move the wiper arm 4 in accordance with the wiping specifications of the control unit 6.

Communication between the control unit 6 and the control device 5 is performed in particular via CAN/LIN bus or another type of communication, e.g. Ethernet. In this case, operation of the vehicle 2 is not necessary; an advantage is that the wipers 4 can also be used even without the ignition of the vehicle 2 being switched on.

It is provided that an environment of the vehicle 2 is monitored either by the control device 5 or by the control unit 6 while the vehicle 2 is in a parked state. In particular, a sensor 7 of the vehicle 2 is used for this purpose. For example, the sensor 7 comprises a precipitation sensor and/or a proximity sensor and/or a camera. Alternatively or additionally, the environment can also be determined by retrieving data from an external instance, e.g. a server. For example, weather data can be retrieved in this way. Likewise, weather data can be detected by means of the sensor 7. Alternatively or additionally, people and/or animals in the environment of the vehicle 2 can also be detected.

Furthermore, it is preferable that a wiper mode for detected conditions in the environment of the vehicle 2 be established, and that the respective drive 3 of the windshield wiper system 1 be controlled by control device 5. The control device 5 thereby enables the wiper 4 to move according to the wiper mode.

Various wiper modes can be provided. An example of three different wiper modes are described hereinafter:

If the weather data includes precipitation to be expected or present, then a precipitation wiper mode is used. In this mode, the wipers 4 are parked in a position that enables precipitation impacting the windshield 8 to drain off. The wipers 4 therefore do not block any precipitation drainage. The precipitation is preferably rain. However, the precipitation wiper mode is also applicable to mineral dust particles, e.g. Saharan dust.

If the weather data includes a snowfall, there is a risk that the snow forms a layer on the windshield 8 that has to be cleared manually. Given a certain layer thickness, overload of the drive 3 and/or the wiper 4 can occur. As a result, a snow wiper mode is provided that prevents a formation of a corresponding layer thickness of snow. To this end, the windshield 8 is wiped with the wiper 4 as long as the weather data includes a snowfall. In this way, snow is cleaned regularly from the windshield 8 so that no layer remains or builds up that is to be cleared manually.

A startle wiper mode is also provided. In this wiper mode, the wiper 4 is moved to startle an animal and/or a human. As previously described, people and/or animals in the environment of the vehicle 2 can be detected. If animals are to be prevented from establishing themselves on the vehicle 2, in particular on the windshield 8, the wipers 4 are moved. In the same way, for example, it can be prevented that people attach advertising fliers or the like to the windshield wiper system 1.

By incorporating the communicative wiper system 1 according to the exemplary embodiment into a communication environment of the vehicle 2, the wipers 4 can be moved as required. The vehicle 2 is not limited to the wiper 4 operating only when the ignition is on. This enables a variety of helpful wiping modes.

The control unit 6 and/or control unit 5 are in particular connected to a server or integrated into a cloud. This enables a user to remotely control the windshield wiper system 1. In particular, a cell phone of the user can be connected to the server or integrated into the cloud by means of a corresponding app. The user can therefore specify a wiping mode at any time, even if the vehicle is parked at a remote location.

The invention claimed is:

1. A windshield wiper system (1) for a vehicle (2), the windshield wiper system (1) comprising:

a drive (3) configured to drive a wiper (4), the wiper (4), and a control device (5) configured to be connected to a continuous power supply of the vehicle (2), and to communicate with at least one control unit (6) of the vehicle (2) via a predefined data transfer protocol, the control device (5) being further configured to receive, from the control unit (6), a wiper mode determined based on a detected condition of an environment of the vehicle (2) while the vehicle (2) is in an inactive state, the inactive state being where an ignition of the vehicle (2) is switched off, and operate the wiper (4) via the drive (3) according to the wiper mode while the vehicle (2) is in the inactive state, wherein the wiper mode is selected from a plurality of predetermined wiper modes based on the detected condition, the plurality of predetermined wiper modes including a precipitation wiper mode that includes parking the wiper (4) in a position that allows precipitation impacting the windshield (8) to drain off, the position being close to an A-pillar and/or parallel to the A-pillar and not at a resting position at a lower portion of the windshield (8).

2. The windshield wiper system (1) according to claim 1, wherein the control device (5) is configured to monitor the environment of the vehicle (2) in the inactive state via at least one sensor (7) of the vehicle (2).

3. A vehicle (2) comprising the windshield wiper system (1) according to claim 1, wherein the windshield wiper system (1) is connected to a server or integrated into a cloud to control the windshield wiper system via the server or via the cloud.

4. A method for controlling a windshield wiper system (1) of a vehicle (2), said system configured to clean a windshield (8) of the vehicle (2) by means of at least one wiper (4), said method comprising the following steps:

monitoring an environment of the vehicle (2) while the vehicle (2) is in a parked state, determining a wiper mode based on a detected condition of the environment of the vehicle (2) in the parked state, and operating the wiper via a drive (3) of the windshield wiper system (1) according to the wiper mode while the vehicle (2) is in the parked state, wherein the wiper mode is selected from a plurality of predetermined wiper modes based on the detected condition, the plurality of predetermined wiper modes including a precipitation wiper mode that includes parking the wiper (4) in a position that allows precipitation impacting the windshield (8) to drain off, the position being close to an A-pillar and/or parallel to the A-pillar and not at a resting position at a lower portion of the windshield (8).

5. The method according to claim 4, wherein monitoring the environment of the vehicle (2) comprises identifying weather data for the environment of the vehicle, wherein the wiper mode is established as a function of the weather data.

6. The method of claim 5, wherein the plurality of predetermined wiper modes includes a snow wiper mode that includes wiping of the windshield (8) with the wiper (4) in response to determining that the weather data includes a snowfall.

7. The method according to claim 4, wherein monitoring the environment of the vehicle (2) includes detecting persons and/or animals, wherein the plurality of predetermined wiper modes includes a startle wiper mode that includes moving the wiper (4) in response to detecting at least one of the persons and/or at least one of the animals.

8. A non-transitory, computer-readable storage medium containing instructions that when executed by a computer cause the computer to monitor, via a sensor, an environment of a vehicle (2) while the vehicle (2) is in an inactive state, the inactive state being where the vehicle (2) is in a parked state and an ignition of the vehicle (2) is switched off, determine a wiper mode based on a detected condition in the environment of the vehicle (2) in the inactive state, and operate a wiper (4) of a windshield wiper system (1) of the vehicle (2), via a drive (3) of the windshield wiper system (1) according to the wiper mode, wherein the wiper mode is selected from a plurality of predetermined wiper modes based on the detected condition, the plurality of predetermined wiper modes including a precipitation wiper mode that includes parking the wiper (4) in a position that allows precipitation impacting the windshield (8) to drain off, the position being close to an A-pillar and/or parallel to the A-pillar and not at a resting position at a lower portion of the windshield (8).

* * * * *